United States Patent
Benedict et al.

(10) Patent No.: US 7,232,029 B1
(45) Date of Patent: Jun. 19, 2007

(54) CANTILEVERED CONVEYING BELT FOR A SORTATION SYSTEM

(75) Inventors: Aric Benedict, Monroe, NC (US); David Patrick Erceg, Concord, NC (US); J. David Fortenbery, Charlotte, NC (US); Andrew B. Fortenbery, Charlotte, NC (US)

(73) Assignee: Mantissa Corporation, Charlotte, NC (US)

(*) Notice: Subject to any disclaimer, the term of this patent is extended or adjusted under 35 U.S.C. 154(b) by 0 days.

(21) Appl. No.: 10/824,198

(22) Filed: Apr. 14, 2004

(51) Int. Cl.
*B65G 15/12* (2006.01)
*B65G 23/44* (2006.01)
*B65G 21/06* (2006.01)

(52) U.S. Cl. .................. 198/817; 198/814; 198/860.1

(58) Field of Classification Search .......... 198/810.01, 198/810.04, 812, 813, 814, 817, 860.1
See application file for complete search history.

(56) References Cited

U.S. PATENT DOCUMENTS

| | | | |
|---|---|---|---|
| 2,480,294 A * | 8/1949 | Hume ........................ 198/814 |
| 2,759,594 A * | 8/1956 | Kleboe et al. .............. 198/814 |
| 2,764,031 A * | 9/1956 | Nystrom ..................... 474/138 |
| 3,952,861 A * | 4/1976 | Holmqvist et al. ......... 198/816 |
| RE30,791 E * | 11/1981 | Kupcikevicius ........ 198/341.07 |
| 4,564,077 A * | 1/1986 | Del Rosso .................. 177/145 |
| 4,733,768 A * | 3/1988 | Aquino et al. ............ 198/369.2 |
| 4,987,994 A | 1/1991 | Kelsey ........................ 198/811 |
| 5,022,514 A | 6/1991 | Lofberg ...................... 198/813 |
| 5,083,657 A | 1/1992 | Kelsey ........................ 198/811 |
| 5,164,777 A * | 11/1992 | Agarwal et al. ............ 198/814 |
| 5,673,784 A * | 10/1997 | Karpinsky et al. ......... 198/831 |
| 5,836,436 A | 11/1998 | Fortenbery ............. 198/370.03 |
| 6,073,755 A * | 6/2000 | Hilliard et al. ............. 198/813 |
| 6,182,815 B1 | 2/2001 | Eggebrecht et al. ..... 198/468.1 |
| 6,206,170 B1 | 3/2001 | Kissel et al. ............. 198/370.4 |
| 6,336,550 B1 * | 1/2002 | Muntener ................... 198/814 |
| 6,708,813 B2 | 3/2004 | Takahashi ................ 198/369.2 |
| 6,745,893 B2 | 6/2004 | von Wedel .................. 198/763 |
| 6,811,018 B2 * | 11/2004 | Cotter et al. ........... 198/810.01 |

* cited by examiner

*Primary Examiner*—Mark A. Deuble
(74) *Attorney, Agent, or Firm*—MacCord Mason PLLC

(57) ABSTRACT

A conveyor system having a primary conveyor and a cantilevered conveying belt. In the preferred embodiment, the cantilevered conveying belt includes a cantilevered frame having at least one conveyor belt and a belt tension assembly attached to the cantilevered frame. In the preferred embodiment, the conveying belt further includes an upstream accumulator.

47 Claims, 9 Drawing Sheets

CANTILEVERED CONVEYING BELT FOR A SORTATION SYSTEM

BACKGROUND OF THE INVENTION (1) Field of the Invention

The present invention relates generally to conveyor systems and, more particularly, to a conveyor system having a cantilevered conveying belt including a cantilevered frame having at least one conveyor belt and a belt tension assembly.

(2) Description of the Prior Art

Conveyor systems such as those used for sorting packages often include an inductor for loading packages to a primary conveyor. U.S. Pat. Nos. 6,206,170 and 5,836,436, commonly owned by applicant, disclose examples of these conveyor systems and are incorporated herein in their entirety. For years, manufacturers of conveyor belt systems have attempted to create an inductor that is efficient, easy to repair, and easily adjustable with regard to the tension of the belts. These efforts have produced several inductor designs that are present in the industry, but none of these inductors offer the benefit of easy belt maintenance and repair.

For example, U.S. Pat. No. 5,083,657, issued to Kelsey, discloses an elaborate method of taking and folding a belt so that the belt makes a 45-degree turn around one pulley, then around another pulley and back out. One problem with this design is the speed at which the belt has to be run because of effect of the geometry. For example, when the horizontal portion of the belt runs at 6 feet per second, the angled portion of the belt is running at about 8 feet per second. Unfortunately, at about 9 feet per second, friction over pulleys can begin to cause the belt to heat up such that some belts may actually catch on fire.

Another example, U.S. Pat. No. 4,987,994 also to Kelsey, discloses drilling tiny holes in the end of the roller shafts and pressurizing the shafts to create an air bearing. One problem with this design is that it uses a large amount of air. In addition, if the air ever fails or the holes fill up with dust, this type of belt design may also cause the belt to inflame.

The most widely accepted designs include a plurality of strip belts rather than a single wide belt. However, a major problem is the weakness of the typical belt due to the splice therein to form the belt, which is usually the point of belt failure. While the belting industry has made improvements to splices, including pealing the surface of the belt before vulcanizing the belt back together, the splices still fail. When the splices fail, it is necessary to replace the belt, but existing conveying belt inductors in the sorters industry are difficult to change efficiently, causing increased costs of labor and downtime.

In addition, another major problem with belts is the fact that belts tend to stretch, thereby requiring adjustments to an inductor to maintain proper belt tension. A belt likes to be pulled and hates to be pushed. If a belt is being pulled, the live load actually creates more tension on the head pulley, which gives the inductor more driving force. When the belt is being pushed with a weight on it, the belt wants to buckle up, the tension actually loosens the tension and the driving force drop.

Thus, there remains a need for a new and improved sortation system having a primary conveyor and a cantilevered conveying belt which provides for quick change of belts while, at the same time, includes an automatic belt and tension assembly.

SUMMARY OF THE INVENTION

The present invention is directed to a conveyor system having primary conveyor and a cantilevered conveying belt. In the preferred embodiment, the cantilevered conveying belt includes a cantilevered frame having at least one conveyor belt and a belt tension assembly attached to the cantilevered frame. In the preferred embodiment, the conveying belt further includes an upstream accumulator.

The cantilevered frame includes a base and a cantilevered deck attached to the base. In the preferred embodiment, the base is lazy L-shaped and includes a vertical support wall. The vertical support wall may further include a horizontal deck mounting surface, which includes a nut bar and a plurality of fasteners for attaching the cantilevered deck to the vertical support wall.

In the preferred embodiment, a portion of the cantilevered deck is trapezoidal shaped and may be formed from a plurality of extruded tubes. The plurality of extruded tubes are preferably joined to one another by finger splices.

Also in the preferred embodiment, the cantilevered frame may further include a support arm having one end selectively moveable to the cantilevered deck. The support arm having one end selectively moveable to the cantilevered deck includes a first connector attached to the base and a second connector attached to the cantilevered deck. In the preferred embodiment, the first connector is a hinge and the second connector is a locking mechanism. The locking mechanism may include an over center latch and a secondary spring lock. The cantilevered frame may further include a belt drive having a plurality of belts; at least one pair of opposed rollers; and a motor attached to at least one of the rollers.

In the preferred embodiment, the belt tension assembly includes a roller support connected to at least one of the rollers; a roller support rod for movably connecting the roller support to the frame; a spring connected between the roller support rod and the frame; and a spring adjustment assembly.

In the preferred embodiment, the spring is a compression spring. Also, the spring adjustment assembly includes: a first fixed spring stop; a second moveable spring stop; and an actuator for adjusting the position of the second moveable spring stop. The actuator for adjusting the position of the second moveable spring stop includes: a threaded rod; a sliding nut; and a drive on one end of the threaded rod. In the preferred embodiment, the drive is a beveled gear drive.

The upstream accumulator includes: a frame; at least one belt; at least one pair of opposed rollers; and a motor attached to at least one of the rollers. The apparatus may further including an accumulator control system. In the preferred embodiment, the accumulator control system includes: a package "on" detector and a package "off" detector. The accumulator control system may further include a control interface to the primary conveyor.

Accordingly, one aspect of the present invention is to provide a conveyor system having a cantilevered conveying belt comprising: a cantilevered frame having at least one conveyor belt; and a belt tension assembly attached to the cantilevered frame.

Another aspect of the present invention is to provide a belt tension assembly for a belt cantilevered conveying belt for a conveyor system, the cantilevered conveying belt having a frame having at least one conveyor belt and a pair of opposed rollers. The belt tension assembly comprises: a roller support connected to at least one of the rollers; a roller support rod for movably connecting the roller support to the frame; a roller support rod spring between the roller support rod and the frame; and a spring adjustment assembly.

Still another aspect of the present invention is to provide a conveyor system having a primary conveyor and a cantilevered conveying belt, the cantilevered conveying belt comprising: a cantilevered frame having at least one inductor belt; a belt tension assembly attached to the cantilevered frame, the belt tension assembly including: (i) a roller support connected to at least one of the rollers; (ii) a roller support rod for movably connecting the roller support to the frame; (iii) a roller support rod spring between the roller support rod and the frame; and (iv) a spring adjustment assembly; and an upstream accumulator.

These and other aspects of the present invention will become apparent to those skilled in the art after a reading of the following description of the preferred embodiment when considered with the drawings.

DESCRIPTION OF THE PREFERRED EMBODIMENTS

Figure 1A:
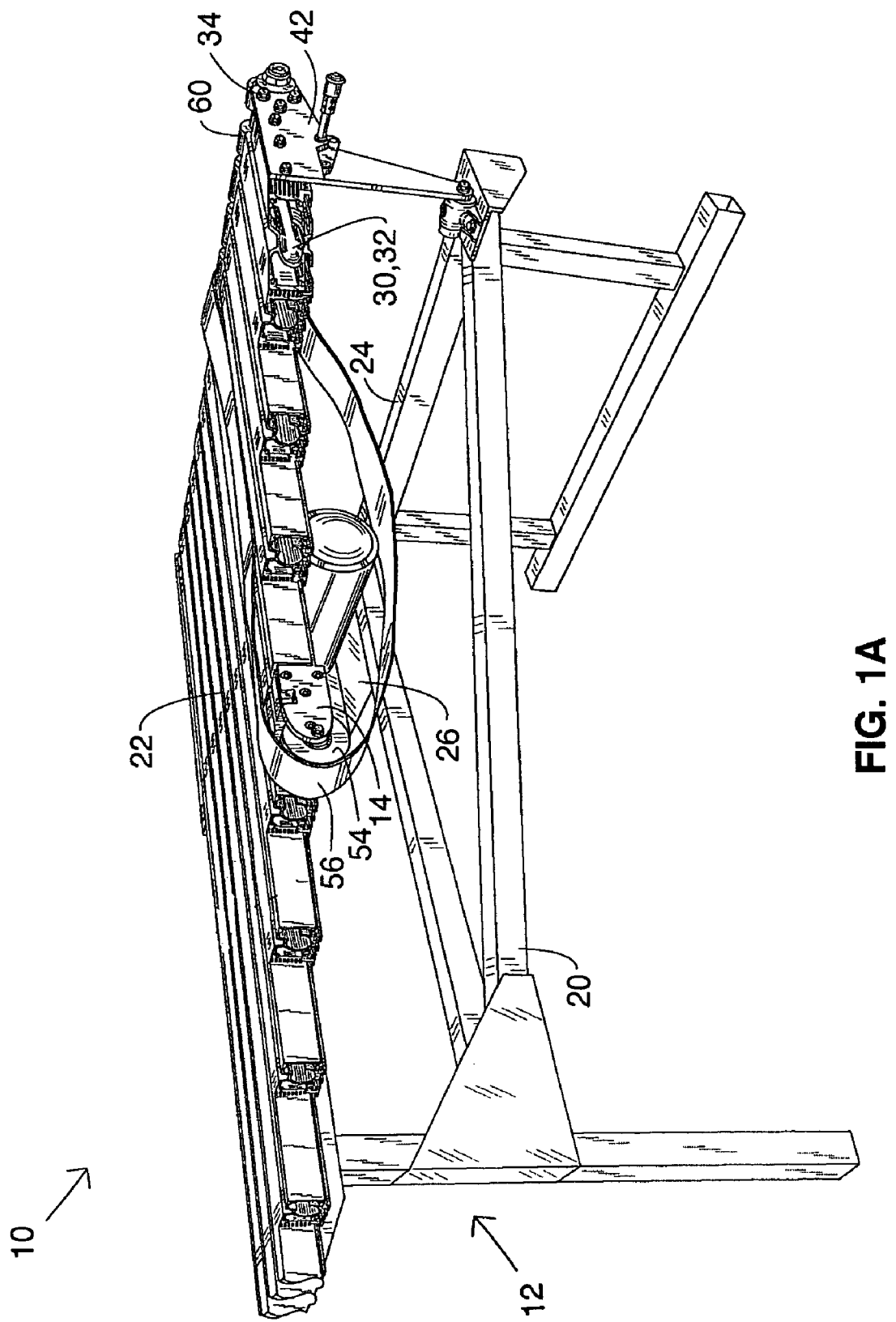
FIG. 1A is a perspective view of cantilevered conveying belt for a conveyor system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 8:
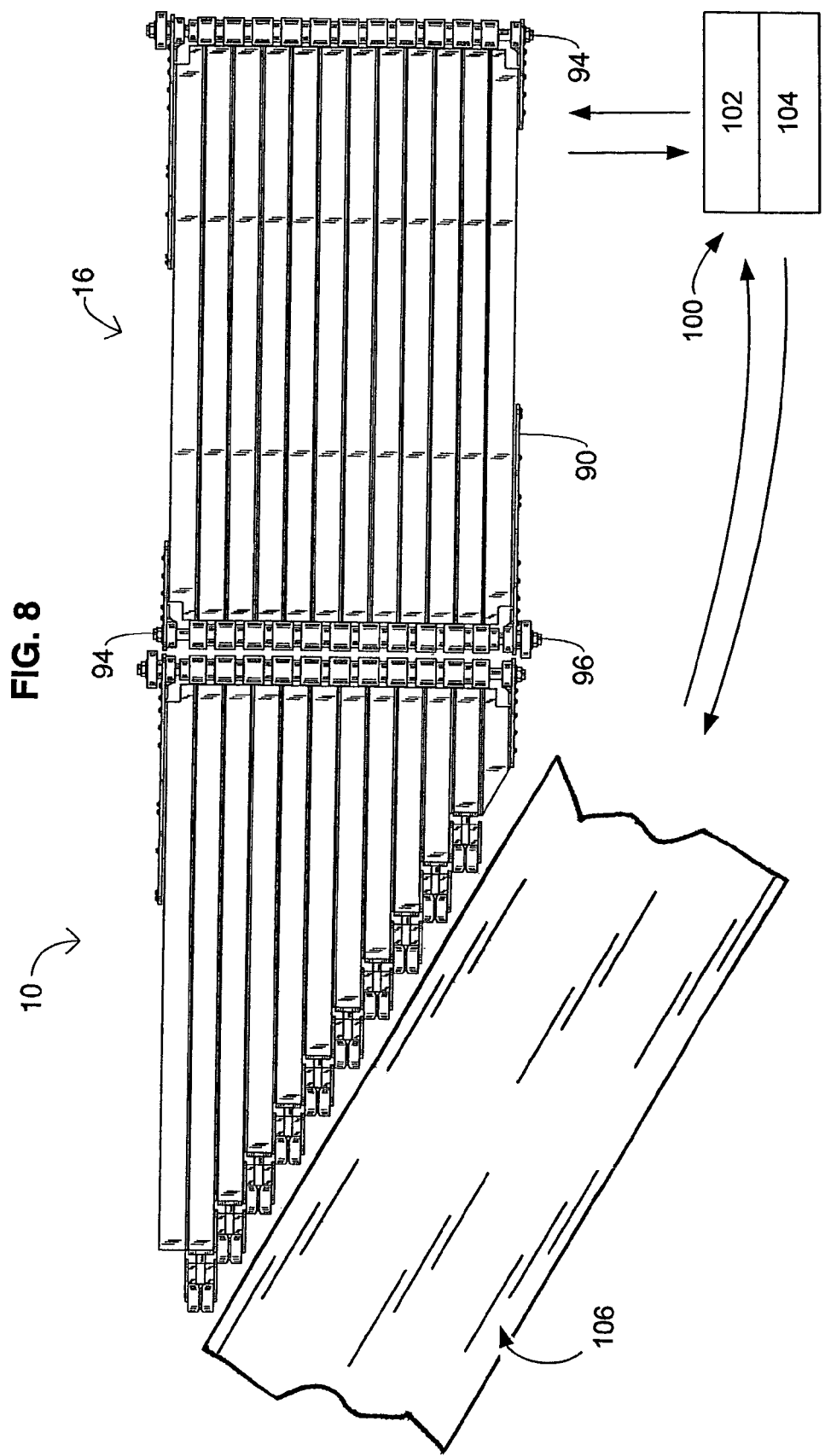
FIG. 8 is a top view of the cantilevered conveying belt shown in FIG. 1 further including an upstream accumulator and a primary conveyor.

Referring now to the drawings in general and FIG. 1 in particular, it will be understood that the illustrations are for the purpose of describing a preferred embodiment of the invention and are not intended to limit the invention thereto. As best seen in FIG. 1, a cantilevered conveying belt generally designated 10, is shown constructed according to the present invention. The cantilevered conveying belt 10 includes a cantilevered frame 12, and a belt tension assembly 14. Preferably, the cantilevered conveying belt 10 is part of a system 8, as shown in FIG. 8, and includes a primary conveyor 106, and an upstream accumulator 16.

Figure 1B:
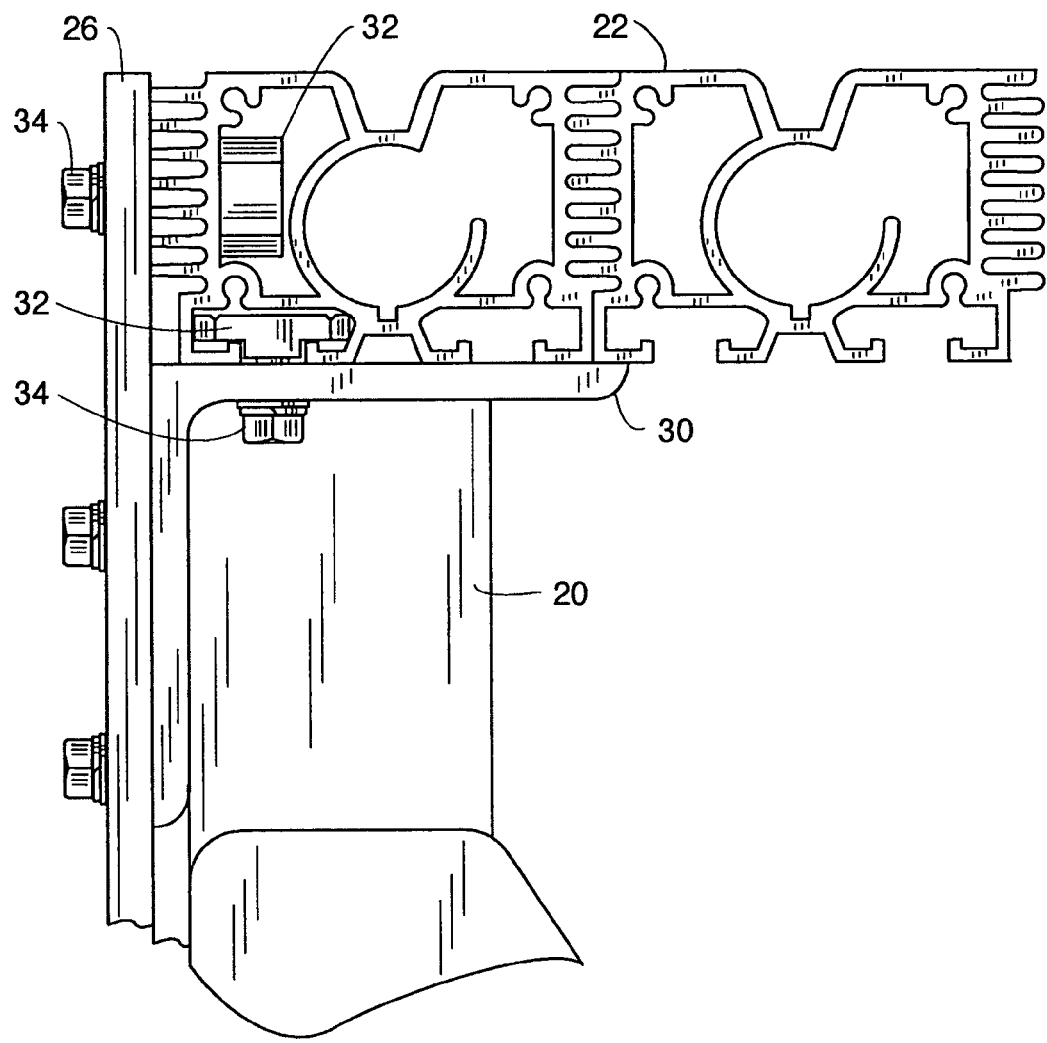
FIG. 1B is an end view of the cantilevered conveying belt of FIG. 1.
Figure 2:
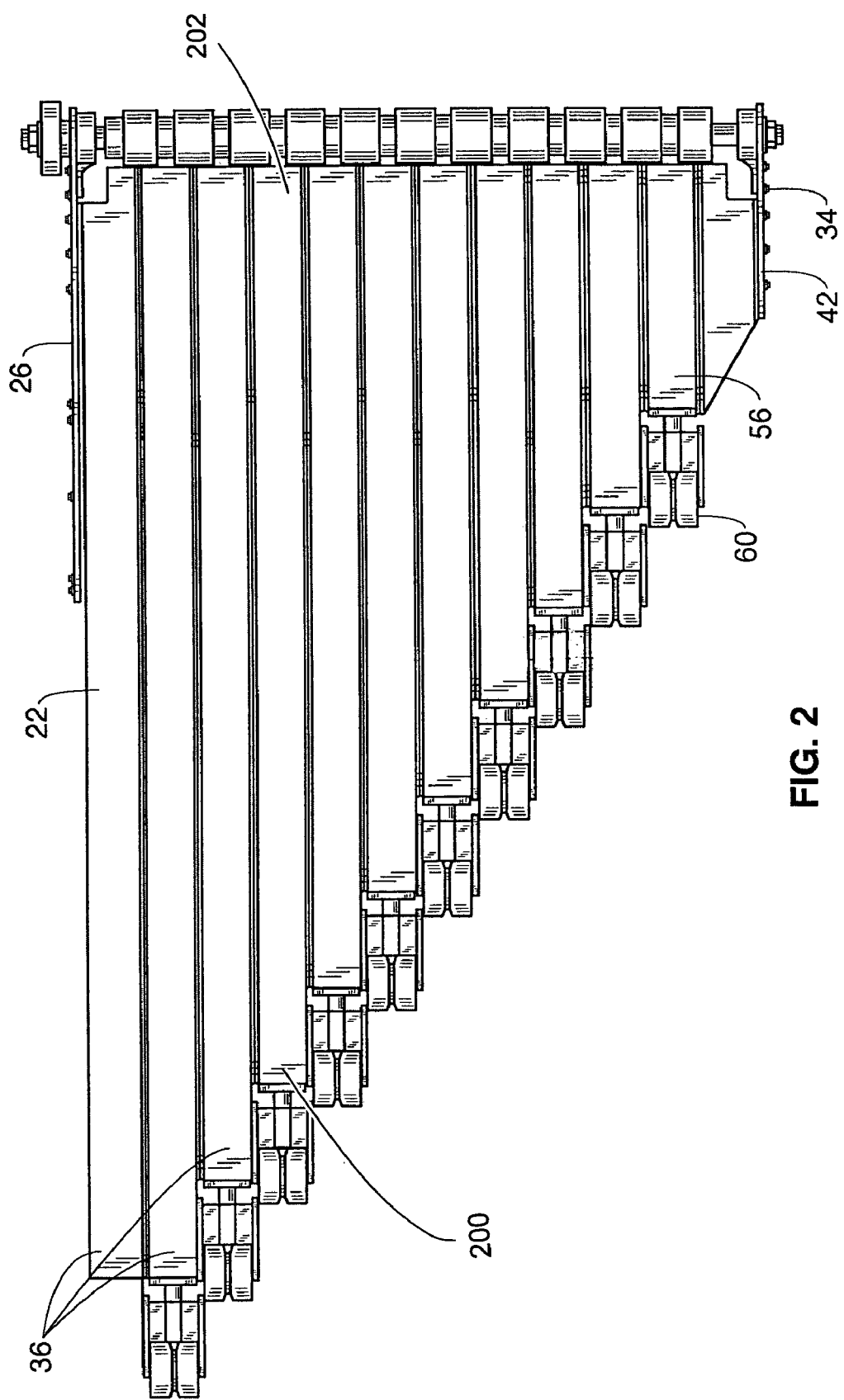
FIG. 2 is a top view of the cantilevered conveying belt shown in FIG. 1.
Figure 4:
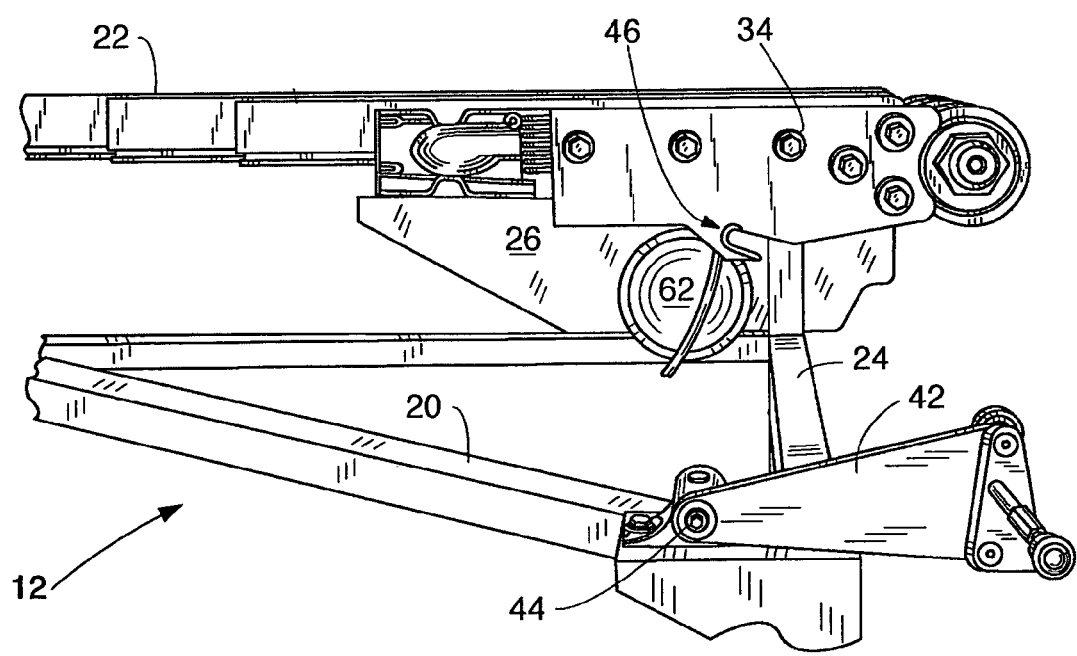
FIG. 4 is an enlarged side view of the cantilevered conveying belt shown in FIG. 1.
Figure 5:
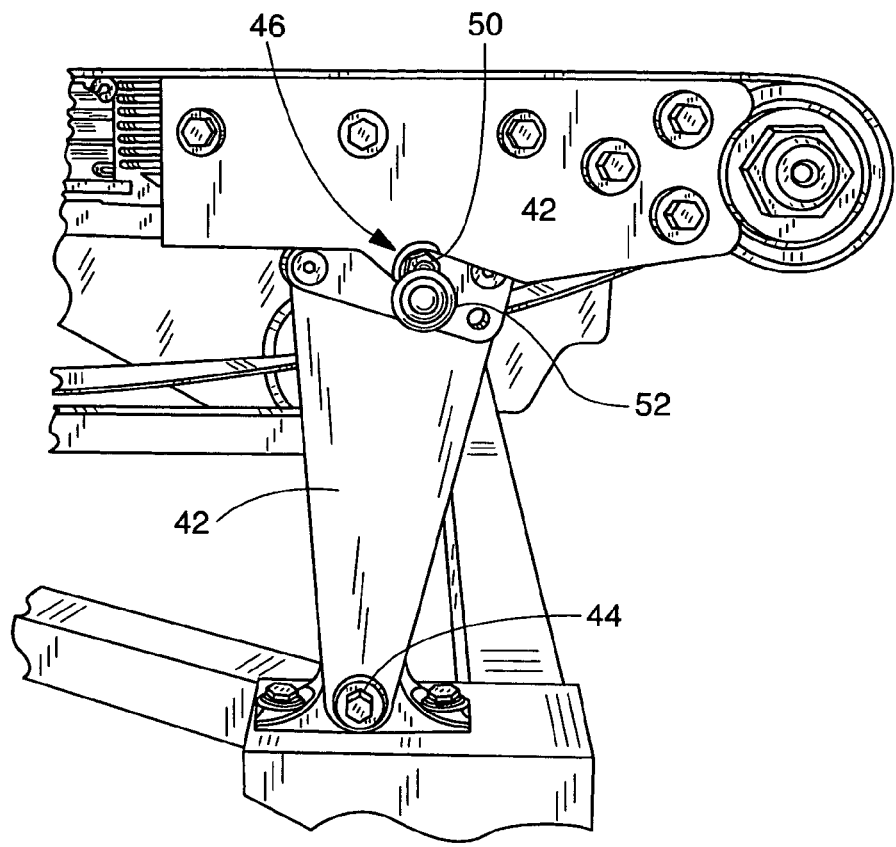
FIG. 5 is a further enlarged side view of FIG. 4, illustrating a support arm having one end selectively moveable to a cantilevered deck.
Figure 6:
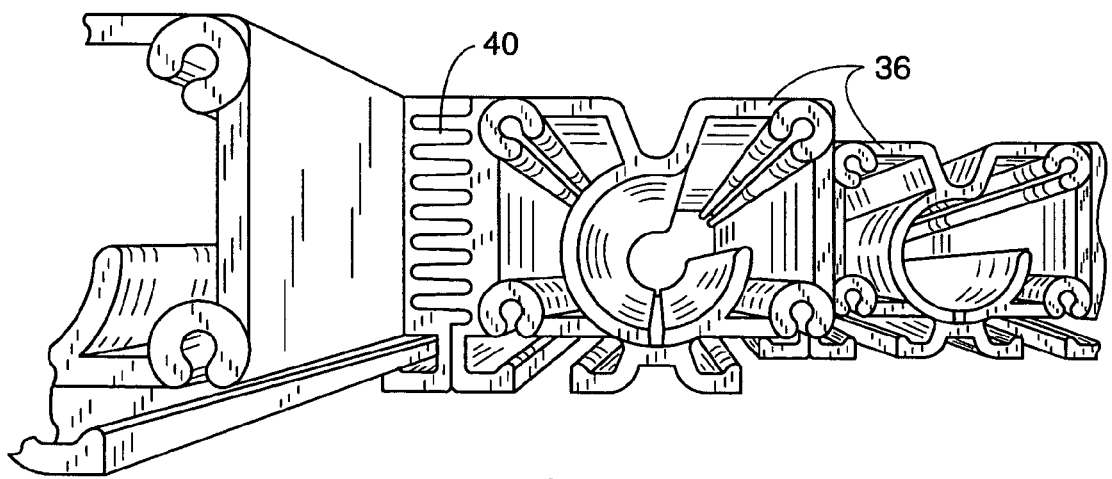
FIG. 6 is an enlarged front view of the cantilevered conveying belt shown in FIG. 1, illustrating a plurality of extruded tubes, which are joined together by finger splices.

As best seen in FIG. 2, the cantilevered deck 22, attached to the base 20, shown in FIG. 1, may be trapezoidal-shaped. The cantilevered deck 22 is formed from a plurality of extruded tubes 36 that are joined together by finger splices 40 as best seen in FIG. 6. The tubes have a first end 200 and a second end 202. The support arm 42 having one end selectively movable to the cantilevered deck 22, shown in FIG. 4, is attached to the base 20 and the cantilevered deck 22 by a first connector at the base 44, where the support arm 42 is hinged, and a second connector 46 at the cantilevered deck 22 wherein there is a locking mechanism. FIG. 5 shows the second connector. The support arm is hinged at the base 44 so that the support arm 42 pivots away from the cantilevered deck 22.

Figure 3:
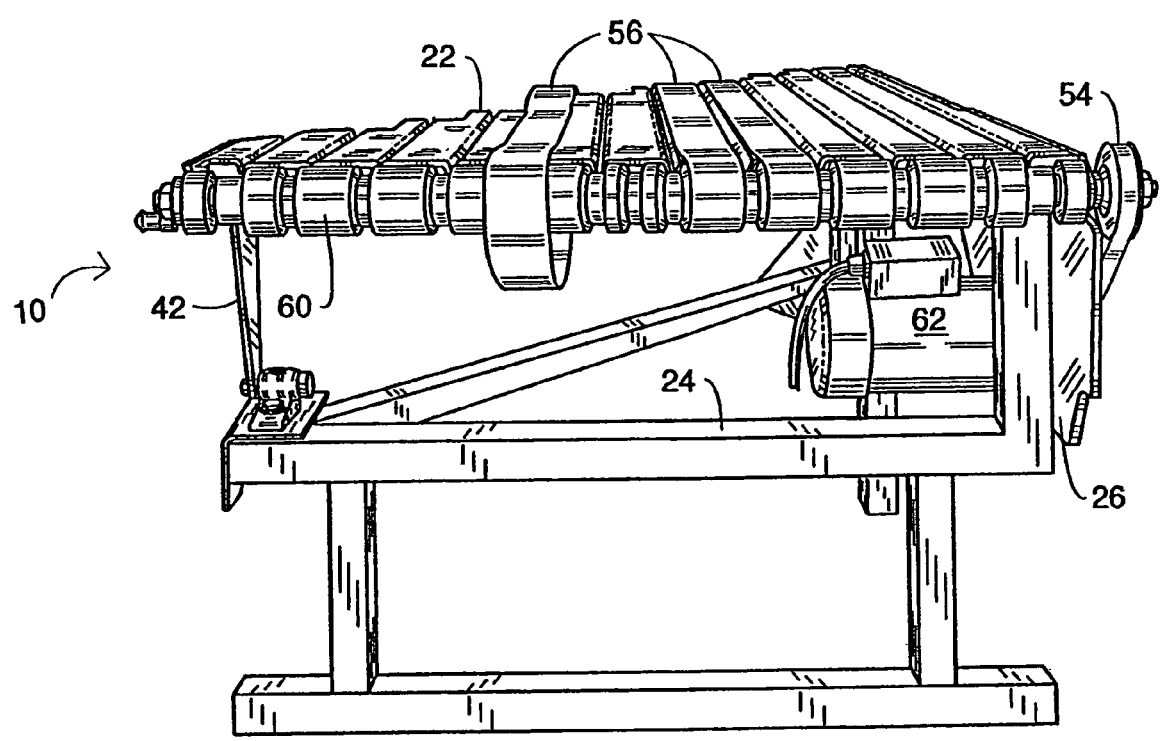
FIG. 3 is a rear view of the cantilevered conveying belt shown in FIG. 1.

The cantilevered conveying belt 10, shown in FIG. 3, further includes a belt drive 54 which is made of a plurality of belts 56, opposed rollers 60 on either end of the cantilevered deck 22, and a motor 62 connected to at least one of the opposed rollers.

FIGS. 1A, 3, and 4 show the cantilevered conveying belt 10 including a base 20, and a support arm 42 having one end selectively movable toward and away from the cantilevered deck 22 and exists in one of at least two positions. In one position, the support arm 42 supports the cantilevered deck 22 and in a second position the arm 42 rests against the base 20 to facilitate changing the belts 56 on the cantilevered deck 22. The base 20 is in a lazy "L" shape and includes a vertical support wall 26. The cantilevered deck 22 is attached to the base (best seen in FIG. 1B) by (i) a horizontal deck-mounting surface 30 that includes a nut bar 32, which is an aluminum piece inserted into the extrusion and fastened to the base by a plurality of fasteners 34; and (ii) a vertical support wall 26 that includes a nut bar 32, which is an aluminum piece inserted into the extrusion and fastened to the vertical support wall 26 by a plurality of fasteners 34.

The locking mechanism shown FIG. 5, includes an over center latch 50 and a secondary spring lock 52. The support arm 42 provides rigidity to the cantilevered deck 22 when the second connector 46 is locked into position. The support arm 42 may be unlocked and moved to cantilever the deck 22, thereby providing an easy method of removing and replacing worn belts.

Figure 7A:
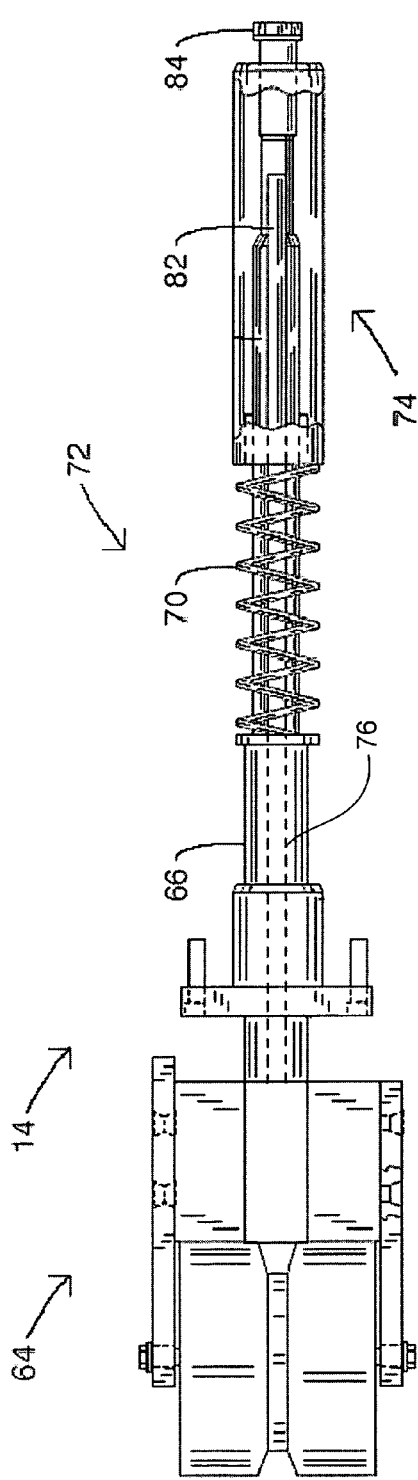
FIG. 7A is a cross-sectional top view of a belt tension assembly constructed according to the present invention.
Figure 7B:
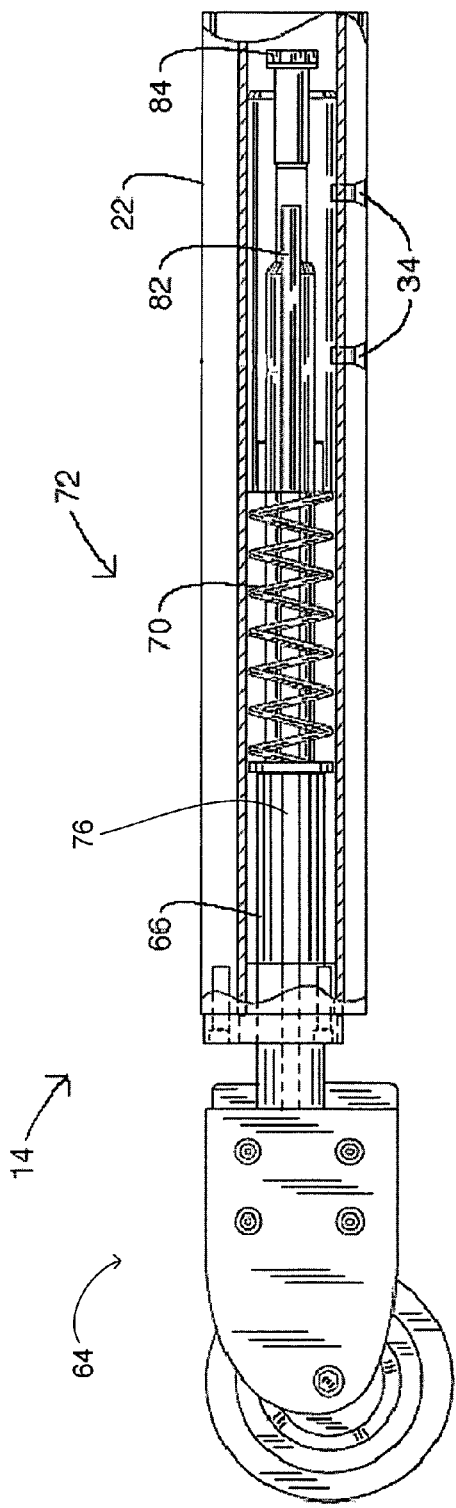
FIG. 7B is a cross-sectional side view of a belt tension assembly shown in FIG. 7A.
Figure 7C:
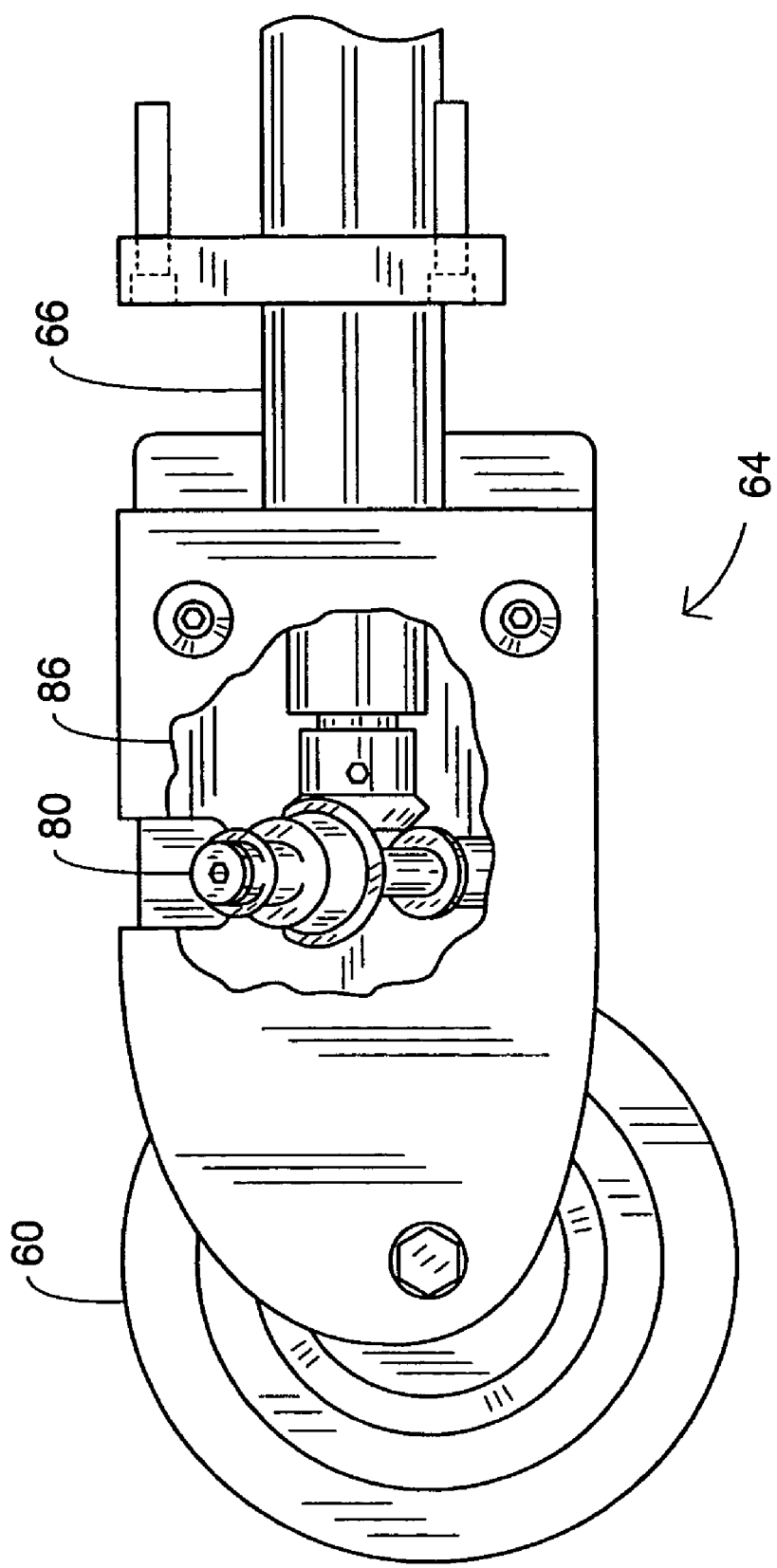
FIG. 7C is an enlarged side view of a roller support for the belt tension assembly shown in FIGS. 7A and 7B.

The belt tensioner assembly 14, best seen in FIGS. 7A, 7B and 7C, includes a roller support 64, a roller support rod 66, a spring 70 that is a compression spring and a spring adjustment assembly 72. The spring adjustment assembly 72 contains a first fixed spring stop 74 that is bolted inside the extrusion tube and fixed in place by a plurality of fasteners. The spring adjustment assembly 72 also has a second movable spring stop 76 and an actuator 80 (located in the roller support 64) for adjusting the second spring stop 76. Within the spring adjustment assembly there is a threaded rod 82, a sliding spring stop 76, and a drive on one end 86, which is a beveled gear drive attached to both said actuator 80 and threaded rod 82. The spring adjustment assembly 72 is divided between the spring stop 74 and the roller support 64.

The upstream accumulator 16, shown in FIG. 8, includes a frame 90, at least one belt (not shown), opposed rollers 94 and a motor connected to at least one roller 96. The upstream accumulator 16 also includes an accumulator control system 100 with a package "on" detector 102 and a package "off" detector 104. The accumulator control system 100 also includes a control interface with a primary conveyor 106.

In operation, the support arm is selectively movable between a first "locked and ready" position and a second "open for repair" position. The locking mechanism's over center latch carries the load of the cantilevered deck when locked into place, with the secondary spring lock acting as a stop. The support arm 42 provides rigidity to the cantilevered deck when the second connector is locked into position. The support arm 42 may be unlocked as needed and moved to cantilever the deck, thereby providing easy access for removing and replacing worn or damaged belts.

The belt tension assembly 14 includes a compression spring and a spring adjustment assembly 72. Within the spring adjustment assembly there is a threaded rod 82, a sliding nut 84 and a drive on one end 86, which is a beveled gear drive. As the spring tension decreases the spring and the spring adjustment assembly presses against the first fixed stop 74 causing the roller support rod 66 and the roller support 64 to extend, thereby causing the belt to automatically adjust its tension.

The upstream accumulator 16 and its control system 100 work with the package "on" detector 102 and a package "off" detector 104. The accumulator control system 100 also works with the control interface with a primary conveyor 106.

Certain modifications and improvements will occur to those skilled in the art upon a reading of the foregoing description. By way of example, the conveyor system into which the cantilevered conveying belt is integrated can be a sortation system or a single portion of a larger sortation system. In addition, the cantilevered conveying belt may be a belt inductor. All such modifications and improvements have been deleted herein for the sake of conciseness and readability but are properly within the scope of the following claims.

We claim:

1. A conveyor system having a primary conveyor and a conveying belt, said conveying belt comprising:
   (a) a frame including a base attached to a deck having at least one conveyor belt, said base including a support arm having one end selectively displaceable from said deck to cantilever said deck from one side thereof; and
   (b) a belt tension assembly attached to said frame.

2. The apparatus according to claim 1, further including an upstream accumulator.

3. The apparatus according to claim 2, wherein said upstream accumulator includes: a frame; at least one belt; at least one pair of opposed rollers; and a motor attached to at least one of said rollers.

4. The apparatus according to claim 2, further including an accumulator control system.

5. The apparatus according to claim 4, wherein said accumulator control system includes: a package "on" detector and a package "off" detector.

6. The apparatus according to claim 4, wherein said accumulator control system further includes a control interface to said primary conveyor.

7. The apparatus according to claim 1, wherein said base is lazy L-shaped.

8. The apparatus according to claim 1, wherein said base includes a vertical support wall.

9. The apparatus according to claim 8, further including a horizontal deck mounting surface attached to said vertical support wall.

10. The apparatus according to claim 9, further including a nut bar and a plurality of fasteners for attaching said deck to said horizontal deck mounting surface.

11. The apparatus according to claim 1, wherein a portion of said deck is trapezoidal shaped.

12. The apparatus according to claim 1, wherein said deck is formed from a plurality of extruded tubes.

13. The apparatus according to claim 12, wherein said plurality of extruded tubes are joined to one another by finger splices.

14. The apparatus according to claim 1, wherein said support arm includes a first connector attached to said base and a second connector attached to said deck.

15. The apparatus according to claim 14, wherein said first connector is a hinge.

16. The apparatus according to claim 14, wherein said second connector is a locking mechanism.

17. The apparatus according to claim 16, wherein said locking mechanism includes an over center latch and a secondary spring lock.

18. The apparatus according to claim 1, wherein said frame further includes a belt drive.

19. The apparatus according to claim 18, wherein said belt drive includes at least one pair of opposed rollers and a motor attached to at least one of said rollers.

20. A belt tension assembly for a conveying belt for a conveyor system, the belt tension assembly having a deck having extending from a support end to a cantilevered end of the deck and a pair of opposed rollers, said belt tension assembly comprising:
   (a) a roller support connected to at least one of said rollers;
   (b) a roller support rod for movably connecting said roller support to said deck;
   (c) a roller support rod spring between said roller support rod and said deck; and
   (d) a spring adjustment assembly including a fixed spring stop, a movable spring stop, and an actuator for adjusting a position of said movable spring stop including a sliding nut and threaded rod having a beveled gear drive on one end.

21. The apparatus according to claim 20, wherein said spring comprises a compression spring.

22. A conveyor system having a primary conveyor and conveying belt, said conveying belt comprising:
   (a) a deck having a first end and a second end and at least one conveyor belt, said deck attached to a base including a support arm having one end selectively displaceable from said deck to cantilever said deck from one side thereof;
   (b) a belt tension assembly attached to one end of said deck, said belt tension assembly including: (i) a roller support connected to at least one of said rollers; (ii) a roller support rod for movably connecting said roller support to said deck; (iii) a roller support rod spring between said roller support rod and said deck; and (iv) a spring adjustment assembly; and
   (c) an upstream accumulator.

23. The apparatus according to claim 22, wherein said upstream accumulator includes: a frame; at least one belt; at least one pair of opposed rollers; and a motor attached to at least one of said rollers.

24. The apparatus according to claim 22, further including an accumulator control system.

25. The apparatus according to claim 24, wherein said accumulator control system includes: a package "on" detector and a package "off" detector.

26. The apparatus according to claim 24, wherein said accumulator control system further includes a control interface to said primary conveyor.

27. The apparatus according to claim 22, wherein said base is lazy L-shaped.

28. The apparatus according to claim 22, wherein said base includes a vertical support wall.

29. The apparatus according to claim 28, wherein said vertical support wall further includes a horizontal deck mounting surface.

30. The apparatus according to claim 29, wherein said horizontal deck mounting surface includes a nut bar and a plurality of fasteners for attaching said deck to said horizontal deck mounting surface.

31. The apparatus according to claim 22, wherein a portion of said deck is trapezoidal shaped.

32. The apparatus according to claim 22, wherein said deck is formed from a plurality of extruded tubes.

33. The apparatus according to claim 32, wherein said plurality of extruded tubes are joined to one another by finger splices.

34. The apparatus according to claim 22, wherein said support arm includes a first connector attached to said base and a second connector attached to said deck.

35. The apparatus according to claim 34, wherein said first connector is a hinge.

36. The apparatus according to claim 34, wherein said second connector is a locking mechanism.

37. The apparatus according to claim 36, wherein said locking mechanism includes an over center latch and a secondary spring lock.

38. The apparatus according to claim 22, wherein conveying belt further includes a belt drive.

39. The apparatus according to claim 38, wherein said belt drive includes a plurality of belts; at least one pair of opposed rollers; and a motor attached to at least one of said rollers.

40. The apparatus according to claim 22, wherein said spring is a compression spring.

41. The apparatus according to claim 22, wherein spring adjustment assembly includes: a first fixed spring stop; a second moveable spring stop; and an actuator for adjusting the position of said second moveable spring stop.

42. The apparatus according to claim 41, wherein said actuator for adjusting the position of said second moveable spring stop includes: a threaded rod; a sliding nut; and a drive on one end of said threaded rod.

43. The apparatus according to claim 42, wherein said drive is a beveled gear drive.

44. A conveying belt comprising:
  (a) a conveyor belt for conveying items from one end of the conveying belt to a distal end;
  (b) a deck having opposing sides extending between the one end and the distal end of the conveying belt; and
  (c) a base coupled to the deck on one of the opposing sides and including a support displaceable from the other of the opposing sides to cantilever the deck from the one side.

45. The conveyor system of claim 44 wherein the conveyor belt is formed in an endless loop removable from the deck with the support displaced through the other of the opposing sides without destruction of the endless loop.

46. The conveyor system of claim 44 wherein the support comprises an arm hinged at one end from the base.

47. A conveyor system having a primary conveyor and a conveying belt, said conveying belt comprising:
  (a) a frame including a deck attached to a base, said base having a support arm with one end selectively movable from said deck to cantilever said deck from one side of said base, said deck including a plurality of extruded tubes joined to one another by finger splices and at least one conveyor belt; and
  (b) a belt tension assembly attached to said frame.

* * * * *